2,960,550
Patented Nov. 15, 1960

2,960,550
ISOMERIZATION PROCESS AND CATALYST

Morris Feller, Park Forest, Ill., and Harry M. Brennan, Hammond, and Herman S. Seelig, Valparaiso, Ind., assignors to Standard Oil Company, Chicago, Ill., a corporation of Indiana No Drawing. Filed Feb. 27, 1958, Ser. No. 717,806

17 Claims. (Cl. 260—683.2)

This application relates to olefin isomerization and more particularly to a unique catalyst system and process employing such catalyst for isomerizing straight-chain terminal olefins, such as butene-1, to straight-chain internal olefins, such as butene-2.

As an end product and also as an intermediate product in various petroleum and petrochemical refining processes, internal olefins, that is, olefins with the double bond other than between carbon atoms at the terminus of a carbon chain, are preferred to terminal olefins, that is, olefins with the double bond between carbon atoms at the terminus of a carbon chain. For example, in the catalytic alkylation of isobutane with butenes to form high-octane components for blending into motor fuels and/or aviation gasolines, it has been found that alkylate produced using butene-2 as feed has a substantially higher Research octane number than alkylate produced using butene-1.

Various processes are available for isomerizing terminal olefins to internal olefins, but such processes generally suffer from one or more limitations, such as, for example, unfavorable equilibrium conditions, excessive cracking of olefin, undesired polymerization of olefin, and the like. It is therefore an object of the present invention to provide a catalyst and process for the isomerization of straight-chain terminal olefins to internal olefins which are capable of operating at favorable equilibrium conditions, particularly temperature, and which do not result in excessive olefin cracking and/or polymerization. It is also an object of the present invention to provide a promoter for such a catalyst system and process. These and other objects of the present invention will become apparent as the detailed description proceeds.

The primary process condition limiting maximum conversion of terminal olefins to internal olefins is reaction temperature. This is illustrated in the following table showing approximate equilibrium percentages for butenes at various temperatures:

| Temp., °C | Butene-1, Wt. percent | Butene-2, Wt. percent | | |
|---|---|---|---|---|
| | | Cis | Trans | Total |
| 60 | 5 | 23 | 72 | 95 |
| 150 | 11 | 28 | 61 | 89 |
| 300 | 16 | 33 | 51 | 84 |

Thus, it can be seen that the lower the temperature the higher the potential conversion of butene-1 to butene-2. The present invention takes advantage of the favorable equilibrium at low temperature by means of a novel catalyst and process wherein maximum conversions are achieved at temperatures below 100° C., e.g., about 20 to 100° C.

To isomerize straight-chain terminal to straight-chain internal olefins in accordance with the present invention, we employ a catalytic medium consisting essentially of a solution, in a halogenated straight-chain organic acid, of a halogen-containing noble metal compound, the noble metal of said noble metal compound being selected from the group consisting of platinum, palladium, and mixtures thereof. In carrying out the novel process of the present invention, the straight-chain terminal olefin or olefins to be isomerized are contacted with the novel catalytic medium above described and the resulting internal olefin separated therefrom by ordinary means, such as, for example, flashing, distillation, decantation, and the like. The invention is advantageously employed to convert such terminal olefins as butene-1, pentene-1, hexene-1, heptene-1, octene-1, nonene-1, decene-1, undecene-1, dodecene-1, and the like.

Examples of halogen-containing noble metal compounds which are advantageously employed in practicing our invention are chloroplatinic acid ($H_2PtCl_6 \cdot 6H_2O$), platinum tetrachloride ($PtCl_4$), platinous chloride ($PtCl_2$), and palladium chloride ($PdCl_2$ and/or $$PdCl_2 \cdot 2H_2O)$$

Further, but not necessarily equivalent, noble-metal compounds which may be employed include platinic fluoride, platinic bromide, platinous bromide, platinic iodide, platinous iodide, palladium fluoride, palladous bromide, palladium iodide, and the like. In general, we prefer to form a solution of the halogen-containing noble metal compound in the halogenated organic acid and thereafter use this catalytic medium for contacting the terminal olefin to be isomerized. Alternatively, the olefin may be separately contacted with either the halogen-containing noble metal compound or with the halogenated organic acid and thereafter the other constituent added. For example, we may first add the olefin to the halogen-containing noble metal compound and thereafter add the halogenated organic acid.

Examples of halogenated organic acids which may be employed in the practice of the present invention are monochloroacetic acid, dichloroacetic acid, trichloroacetic acid, monofluoroacetic acid, difluoroacetic acid, trifluoroacetic acid, tribromoacetic acid, triiodoacetic acid, monochloropropionic acid, monofluoropropionic acid, monochlorobutyric acid, and the like, including mixtures thereof. In general, we prefer the halogenated acetic acids, and optimally trifluoroacetic and/or trichloroacetic acids.

Effective conversions may be carried out at ambient temperatures, e.g., about 20° C. or higher. The upper temperature is limited only by decomposition considerations which, in general, may be ignored since substantially lower temperatures are preferred to take advantage of more-favorable equilibrium conditions. Thus, to operate under favorable equilibrium conditions and to obtain maximum conversion, the preferred temperature range is about 25 to 100° C., optimally 40 to 80° C. Atmospheric pressure and pressures higher or lower than atmospheric may also be used. When carrying out the process batchwise, we prefer to use sufficient pressure to maintain the olefin as a liquid so that both the catalyst and the olefin are in a liquid-like phase. Thus, in the case of butenes, for example, pressures of at least about 3–5 atmospheres are normally employed. It should be understood, however, that it is only necessary that the catalytic medium be in the liquid phase since satisfactory conversions may be obtained by the simple technique of bubbling gaseous olefin through the catalytic medium. In general, we prefer to operate the system at pressures in the range of about 1 to 20 atmospheres.

If the terminal olefin, the halogen-containing noble metal compound, and the halogenated organic acid are present, some olefin isomerization generally results regardless of the relative proportions or concentrations of each.

In practice, however, we prefer to use concentrations of the halogen-containing noble metal compound above about 0.01 mol percent, based on olefin, usually about 0.1 to 10 mol percent, and optimally 0.2 to 2 mol percent. At least about 5 mols of halogenated organic acid per mol of the noble metal compound are usually employed, preferably about 10 to 1000 mols, and optimally about 20 to 100 mols.

Contact time is usually governed by the degree of isomerization desired, and usually is substantially in excess of about 1 second. When bubbling gaseous olefin through the catlytic medium, isomerized product is almost immediately detected in the gaseous effluent. When operating batchwise, however, a first-cycle induction period, which is believed to be associated with formation of a complex, as hereinafter described, may be encountered. In some instances, the induction period may take at least several hours before any significant conversion results. The weight hourly space velocity (i.e., weight of olefin per hour per unit weight of noble metal compound) may vary from about 0.1 to 1000.

For economic operation, however, space velocity should be at least above about 1, and preferably above 10. Economic operation also requires substantially complete recovery of platinum from spent catalytic medium and such recovery can be effected by conventional techniques known to the art, such as, for example, precipitating the platinum by hydrogen treating at elevated temperature (e.g., 100° C.) and recovering platinum from the precipitate.

In a particularly advantageous embodiment of the present invention, it has been discovered that the first-cycle induction period may be minimized and reaction rate increased by addition to the reaction zone of water or an aliphatic alcohol promoter, such as, for example, methanol, ethanol, propanol, butanol, and the like. Mixtures of water and aliphatic alcohols, or of various aliphatic alcohols may, of course, be employed. The promoter may be added at any point, that is, to the olefin, to the noble metal compound, to the halogenated organic acid, to the solution of the noble metal and halogenated organic acid, to the complex of the olefin and the noble metal compound in the presence or absence of the halogenated organic acid, and the like. In general, it is preferred to add the promoter prior to complex formation in the first cycle so that the promoter is immediately available to minimize the induction period. For significant promotion, at least about 1 mol of promoter is required per mol of the noble metal compound. We prefer to use about 1 to 100 mols of promoter per mol of noble metal compound, and optimally about 1 to 20 mols of promoter per mol of noble metal compound when employing water as promoter and about 5 to 50 mols of promoter per mol of noble metal compound when employing an aliphatic alcohol as promoter.

It is believed that the olefin to be converted and the halogen-containing noble metal compound form a complex or liquid-like complex structure, which may be the same as or similar to the complexes described by the art (e.g., "Coordination Compounds of Platinous Halides with Unsaturated Substances," Kharasch and Ashford, JACS, 58, 1736 (1936)). The halogenated organic acid appears to act in the nature of a co-catalyst solvent which adjusts the stability of the noble-metal-halogen-olefin complex such that a terminal olefin enters the complex while an internal olefin is released from the complex at approximately the same rate, said rate being feasibly operative, i.e., substantial isomerization in less than about a week. In the embodiment wherein water and/or aliphatic alcohol is used as a promoter, it is submitted that such promoter initially speeds up the rate of complex formation and/or increases the rate at which the organic-acid-stabilized-complex takes in terminal olefins and releases internal olefins. The above theory is, of course, presented as one possible explanation of the invention, and we do not necessarily wish to be bound or limited thereby. Regardless of the mechanism, we have found that contacting of a straight-chain terminal olefin with a solution of a halogen-containing noble metal compound in a halogenated straight-chain organic acid results in isomerization of the olefin to an internal olefin.

In carrying out our invention we prefer to use chloroplatinic acid as the halogen-containing noble metal compound, trichloroacetic acid as the halogenated organic acid, and water as the promoter. As previously pointed out, preferred temperatures are in the range of about 25 to 100° C. and pressures in the range of about 1 to 20 atmospheres.

The invention will be more clearly understood from, and illustrated by, the following specific examples.

Example I 30 ccs. of butene-1 were contacted with a catalyst prepared in accordance with the present invention at 60° C. and about 6 atmospheres pressure. The catalytic medium was prepared by dissolving 1 gram of chloroplatinic acid in 15.8 grams of monochloroacetic acid. The product, containing isomerized olefin, was separated by flashing at atmospheric pressure. The results were as follows:

| Time, hours: | Conv. to butene-2, percent of equilibrium |
|---|---|
| 24 | 7 |
| 44 | 26 |

The above data show substantial isomerization of butene-1, the conversion substantially increasing with time.

Example II 30 ccs. of butene-1 were contacted with a catalyst prepared in accordance with the present invention at 60° C. and about 6 atmospheres pressure. The catalytic medium was prepared by dissolving 1 gram of chloroplatinic acid in 16.0 grams of trichloroacetic acid. The product, containing isomerized olefin, was separated by flashing at atmospheric pressure. The results were as follows:

| Time, hours: | Conv. to butene-2, percent of equilibrium |
|---|---|
| 22 | 11 |
| 68 | 94 |

The above data demonstrate the very high degree of isomerization of which the present catalyst system is capable. These data also indicate that the reaction rate when using trichloroacetic acid is faster than that when using monochloroacetic acid.

Example III 30 ccs. of butene-1 were contacted with a catalyst prepared in accordance with the present invention at 60° C. and about 6 atmospheres pressure. The catalytic medium was prepared by dissolving 1 gram of chloroplatinic acid in 16.0 grams of trifluoroacetic acid. The product, containing isomerized olefin, was separated by flashing at atmospheric pressure. The results were as follows:

| Time, hours: | Conv. to butene-2, percent of equilibrium |
|---|---|
| 20 | 93 |

Example IV

A series of runs were made wherein the same catalytic medium was used for a number of cycles and butene-1 was employed as feed. The catalytic medium was prepared by dissolving 1 gram of chloroplatinic acid in 16 grams of trichloroacetic acid. For each cycle 30 ccs. of butene-1 were contacted with catalytic medium at 60° C. and about 6 atmospheres pressure. An induction period of several hours was required at the beginning of the first cycle before any appreciable isomerization occurred. After about 25 hours of the fourth cycle, about 0.6 ccs. of ethanol was added to the reaction zone as a promoter. In all cases the product, containing the isomerized olefin, was separated by flashing at atmospheric pressure. The results were as follows:

| Cycle | Time, Hours | Conv. to Butene-2, percent of Equilibrium |
|---|---|---|
| 1 | 68 | 94 |
| 2 | 21 | 88 |
| 3 | 22 | 79 |
|   | 25 | 79 |
| 4 | 46 | 96 |

The above data illustrate the high conversions characteristic of the present system and also the fact that the catalyst may be used for a plurality of cycles. When there is an indication of a slowdown of reaction rate, as in cycle 3 as compared with cycle 2, a promoter may be employed, as in cycle 4, to raise the reaction rate substantially.

*Example V*

This example illustrates utility of the present invention for isomerizing octene-1 to internal octene and/or for preparing an internal (secondary) alcohol from a terminal olefin. The catalyst was prepared by dissolving 1 gram of chloroplatinic acid in 16 grams of trichloroacetic acid. The resulting medium was then used to contact 30 ccs. of octene-1 at about 60° C. and essentially atmospheric pressure for about 16 hours. Isomerization to internal octene exceeded about 50 percent of equilibrium. Internal olefin is then converted to secondary alcohols by usual hydrolysis techniques, e.g., contacting with aqueous acids, and the like.

*Example VI*

A series of runs were made to show the effects of omitting either the halogen-containing noble metal compound or the halogenated organic acid, as compared with results obtained when both are present. In all runs, contacting was carried out with the olefin in liquid phase at about 6 atmospheres and 60° C. Product, containing the isomerized olefin, was separated by flashing at atmospheric pressure. The results were as follows:

| Catalyst | | Butene-1, ccs. | Time, Hours | Conv. to Butene-2, Percent of Equilibrium |
|---|---|---|---|---|
| Grams of $H_2PtCl_6 \cdot 6H_2O$ | Grams of Trichloroacetic Acid | | | |
| 2 | 0 | 60 | 20 | <5 |
| 0 | 16 | 30 | 21 | <5 |
| 1 (2nd Cycle) | 16 | 30 | 21 | 88 |

The above data clearly show that without the catalytic medium of the present invention, the system is substantially inoperative.

While the invention has been described in connection with certain specific embodiments it is to be understood that such embodiments are illustrative only, and not by way of limitation. Numerous additional embodiments of the invention and alternative manipulative techniques and operating conditions will be apparent from the foregoing description to those skilled in the art. It should be understood, for example, that while the catalytic medium is a non-solid liquid and/or a liquid-like complex, it could be held within the pores of a solid material so that in a continuous process the flowing olefins would not sweep along the catalytic medium.

Having thus described the invention in detail, what is claimed is:

1. A catalyst for isomerizing straight-chain terminal olefins to straight-chain internal olefins consisting essentially of a solution of a halogen-containing inorganic noble metal compound in a halogenated straight-chain organic acid, the noble metal of said noble metal compound being selected from the group consisting of platinum, palladium, and mixtures thereof.

2. The catalyst of claim 1 wherein said noble metal compound is chloroplatinic acid.

3. The catalyst of claim 1 wherein said noble metal compound is platinum tetrachloride.

4. The catalyst of claim 1 wherein said noble metal compound is palladous chloride.

5. The catalyst of claim 1 wherein said halogenated straight-chain organic acid is trichloroacetic acid.

6. The catalyst of claim 1 wherein said halogenated straight-chain organic acid is trifluoroacetic acid.

7. A process for isomerizing a straight-chain terminal olefin to a straight-chain internal olefin which comprises contacting the terminal olefin with a solution of a halogen-containing noble metal compound in a halogenated straight-chain organic acid, the noble metal of said noble metal compound being selected from the group consisting of platinum, palladium, and mixtures thereof; and separating the resulting internal olefin therefrom.

8. The process of claim 7 wherein said noble metal compound is chloroplatinic acid.

9. The process of claim 7 wherein said halogenated straight-chain organic acid is trichloroacetic acid.

10. The process of claim 7 wherein said halogenated straight-chain organic acid is trifluoroacetic acid.

11. A process for isomerizing a straight-chain terminal olefin to a straight-chain internal olefin which comprises contacting the terminal olefin at a temperature above about 20° C. with a solution of above about 0.01 mol percent, based on olefin, of a halogen-containing noble metal compound, the noble metal of said noble metal compound being selected from the group consisting of platinum, palladium, and mixtures thereof, and about 5 to 5000 mols of a halogenated straight-chain organic acid per mol of noble metal compound; and separating the resulting internal olefin therefrom.

12. The process of claim 11 wherein said noble metal compound is chloroplatinic acid.

13. The process of claim 11 wherein said halogenated organic acid is trifluoroacetic acid.

14. The process of claim 11 wherein said halogenated organic acid is trichloroacetic acid.

15. A process for isomerizing a straight-chain terminal olefin to a straight-chain internal olefin which comprises contacting the terminal olefin at a temperature of about 25 to 100° C. with about 0.01 to 10 mol percent, based on olefin, of chloroplatinic acid in the presence of about 10 to 1000 mols of trifluoroacetic acid per mol of chloroplatinic acid; and separating the resulting internal olefin therefrom.

16. A process for isomerizing butene-1 to butene-2 which process comprises contacting butene-1 with a liquid solution of chloroplatinic acid dissolved in a halogenated straight-chain organic acid at a temperature about 60° C. and a pressure between about 1 and 6 atmospheres, the mol ratio of said chloroplatinic acid to said butene-1 being about 0.006, the mol ratio of said organic acid to said chloroplatinic acid being between about 50 and 85, and thereafter separating butenes from said liquid solution.

17. The process of claim 16 wherein said organic acid is selected from the class consisting of monochloroacetic acid, trichloroacetic acid, and trifluoroacetic acid.

References Cited in the file of this patent
UNITED STATES PATENTS

| 2,479,110 | Haensel | Aug. 16, 1949 |
| 2,777,805 | Lefrancois et al. | Jan. 15, 1957 |
| 2,804,490 | Belden | Aug. 27, 1957 |
| 2,861,960 | De Boer et al. | Nov. 25, 1958 |